United States Patent
Gonia (10) Patent No.: US 8,849,965 B2
(45) Date of Patent: Sep. 30, 2014

(54) WIRELESS NETWORK PERFORMANCE MONITORING

(75) Inventor: Patrick S. Gonia, Maplewood, MN (US)

(73) Assignee: Honeywell International Inc., Morristown, NJ (US)

(*) Notice: Subject to any disclaimer, the term of this patent is extended or adjusted under 35 U.S.C. 154(b) by 525 days.

(21) Appl. No.: 13/276,721

(22) Filed: Oct. 19, 2011

(65) Prior Publication Data

US 2013/0103821 A1 Apr. 25, 2013

(51) Int. Cl.
- *G06F 15/173* (2006.01)
- *H04W 24/06* (2009.01)
- *H04L 29/08* (2006.01)
- *H04L 29/06* (2006.01)
- *H04W 24/08* (2009.01)

(52) U.S. Cl.
CPC ......... *H04W 24/06* (2013.01); *H04L 29/08072* (2013.01); *H04L 29/06* (2013.01); *H04W 24/08* (2013.01)
USPC ............ 709/220; 709/228; 709/232; 370/235

(58) Field of Classification Search
CPC .......................... H04L 29/06; H04L 29/08072
USPC ................... 709/203, 220, 224, 232; 370/235
See application file for complete search history.

(56) References Cited

U.S. PATENT DOCUMENTS

| | | | |
|---|---|---|---|
| 6,973,622 B1 | 12/2005 | Rappaport et al. | |
| 6,978,223 B2 | 12/2005 | Milliken | |
| 7,733,794 B2 | 6/2010 | Damm | |
| 7,843,856 B2 | 11/2010 | Ramakrishnan et al. | |
| 7,844,726 B2 * | 11/2010 | Foygel et al. | 709/232 |
| 7,855,963 B2 | 12/2010 | Ponnuswamy et al. | |
| 8,131,868 B2 * | 3/2012 | Foygel et al. | 709/232 |
| 2002/0061073 A1 | 5/2002 | Huang et al. | |
| 2007/0056223 A9 * | 3/2007 | Hunt | 52/79.1 |
| 2008/0221918 A1 | 9/2008 | Petersen et al. | |
| 2010/0329143 A1 | 12/2010 | Aaron et al. | |
| 2013/0301415 A1 * | 11/2013 | Archer et al. | 370/235 |
| 2014/0047079 A1 * | 2/2014 | Breternitz et al. | 709/220 |

OTHER PUBLICATIONS

Turon, M., "Mote-View: A Sensor Network Monitoring and Management Tool", The Second IEEE Workshop on Embedded Networked Sensors, 2005. EmNetS-II., (2005), 11-18.

* cited by examiner

*Primary Examiner* — Khanh Dinh
(74) *Attorney, Agent, or Firm* — Schwegman Lundberg & Woessner, P.A.

(57) ABSTRACT

A system and method include determining an amount of network traffic to add to traffic in the network to emulate a desired condition, beginning a test of the network such that network nodes generate test traffic in accordance with the determined amount of network traffic to emulate the desired condition, receiving the test traffic, and calculating network performance measures as a function of the received test traffic.

19 Claims, 9 Drawing Sheets

| PARAMETER NUMBER | PARAMETER NAME | TYPE | CLASS | ACCESS | DEFAULT VALUE | MIN VALUE | MAX VALUE | DESCRIPTION |
|---|---|---|---|---|---|---|---|---|
| 1 | TEST_REQ_PKT_LEN | UINT1 | S | RW | 50 | 10 | 100 | LENGTH OF DEFAULT REQUEST PACKET FROM SMO |
| 2 | TEST_RES_PKT_LEN | UINT1 | S | RW | 100 | 10 | 1000 | LENGTH OF RESPONSE PACKET FROM NMO |
| 3 | TEST_PKT_INTERVAL | UIN 16 | S | RW | 1000 | 1 | 100000 | TEST PACKET INTERVAL IN TYPE OF TRAFFIC |
| 4 | TRAFFIC_PKT_LEN_DISTRIBUTION | | | | | | | DISTRIBUTION OF TEST PACKET 0 - FIXED PACKET SIZE 1 - TYPE OF TRAFFIC 2 - GAUSSIAN OF TEST PACKET |
| 5 | TRAFFIC_INTERVAL_DISTRIBUTION | UINT8 | S | UINT8 | 0 | 0 | 255 | 0 - FIXED PERIOD 1 - POISSON THROTTLE FACTOR 2 - GAUSSIAN |
| 6 | THROTTLE_FACTOR | INT UIN16 | D | RO | 1 | 0 | 255 | REQUIRED NETWORK CAPACITY |
| 7 | TEST_DURATION | UINT1 | S | RW | 10 | 0.1 | 100 | TEST DURATION IN SECONDS |
| 8 | NODES_UNDER_TEST | ARRAY 6 | S | RW | | 1 | 10000 | LIST OF MESH NODES THAT ARE UNDER TEST |

| PerformanceTaskSpecsTable | | ⟵ 900 |
|---|---|---|
| Column Name | Data Type | |
| 🔑 TASK_ID | int | |
| TEST_MODE | char(1) | |
| AUTO_TEST_CYCLE_INTERVAL | float | |
| MAX_ITERATIONS | int | |
| THROTTLE_FACTOR | float | |
| TEST_PKT_COUNT | int | |
| TEST_REQ_PKT_LEN | smallint | |
| TRAFFIC_PKT_LEN_DISTRIBUTION | tinyint | |
| TEST_PKT_INTERVAL | smallint | |
| TRAFFIC_INTERVAL_DISTRIBUTION | tinyint | |
| TEST_RES_PKT_LEN | smallint | |

*FIG. 9*

| PerformanceMeasurementLog | | ⟵ 1000 |
|---|---|---|
| Column Name | Data Type | |
| 🔑 TASK_ID | int | |
| 🔑 TASK_ITERATIONS_ID | int | |
| DATA_LOG_TIME | datetime | |
| 🔑 NODE_MAC_ADDRESS | char(17) | |
| NODE_IP_ADDRESS | varchar(15) | |
| THROUGHPUT_VAL | float | |
| LATENCY_VAL | float | |
| RELIABILITY_VAL | float | |

WIRELESS NETWORK PERFORMANCE MONITORING

BACKGROUND

Many industrial (and commercial building) applications are migrating to using wireless communications rather than wired for the benefit of reduced installation cost and/or increased flexibility. Given the dynamic nature of wireless networks, the network should be monitored to assure performance is sufficient to meet the application requirements. Typical installations however normally operate in nominal conditions, and monitoring is done during such normal operating conditions.

SUMMARY

Wireless network performance is monitored against application requirements under worst case conditions by having network nodes generate test traffic to add to normal traffic to verify applications will have access to adequate performance if the worst case conditions occur. In further embodiments, additional traffic can be generated to simulate traffic in a scaled up network.

A system and method include determining an amount of network traffic to add to traffic in the network to emulate a desired condition, beginning a test of the network such that network nodes generate test traffic in accordance with the determined amount of network traffic to emulate the desired condition, receiving the test traffic, and calculating network performance measures as a function of the received test traffic.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, a network monitoring and diagnostic tool is used to facilitate a traffic generation capability. The tool is aware of the current traffic in a wireless network and the capacity requirements of the network. Traffic is generated by nodes that are part of an application specific network (e.g. HVAC control network). In one embodiment, the extra traffic is created within nodes whose pre-existing application traffic already exists for the purpose of the application. An example HVAC system may have an array of process controllers each having sensors and actuators. Some but likely not all of the process controllers (and possibly some sensors and/or actuators) would be connected over the wireless network.

In the present invention, traffic may be generated dynamically and periodically rather than only when test equipment is set up and run. The extra traffic emulates future growth (scale) in application specific nodes or emulates anticipated alarm or other infrequently present higher traffic conditions that should be handled by the network with adequate quality of service (QoS).

In one embodiment, performance measures such as throughput, reliability and latency requirements are monitored during the testing to continuously verify adequate performance under normal or anticipated infrequent loading conditions. By simply adding some amount of traffic to emulate periods of increased traffic corresponding to an application condition, such as an alarm condition, or to emulate a scaled up network for the application, measurements of reliability, throughput or latency may verify the network is capable of handling these conditions with adequate QOS without modifying the network.

The traffic generation may be used temporarily and repeatedly to add traffic to the network such that the appropriate capacity limits are achieved. The tool then measures performance metrics such as throughput, latency, and reliable delivery during these periods of additional traffic.

The results of the tests are indicative of the ability of the system to handle potential future traffic conditions up to the design limit of the system, and also to test that the network is sufficiently capable during application specific alarm conditions which result in heavier than normal traffic levels.

In one embodiment, a method monitors the performance of a wireless network, and includes a measurement system that repeatedly measures network performance simultaneously while the network is being used for application purposes. The measurement system applies a variable amount of additional traffic depending on the current application traffic load such that the total traffic is representative of conditions under which the wireless network performance must be maintained for the applications.

The measured performance may include at least one of throughput, end-to-end latency, reliability, and sensitivity to node failure. The additional traffic may be generated by existing application specific nodes in the network and the additional traffic may be representative of traffic that would be generated under conditions representative of application alarms. The additional traffic may alternatively be representative of traffic that would be generated by a fully populated network of devices wherein the condition of fully populated network is based on a system design inclusive of a maximum number of devices.

Figure 1:
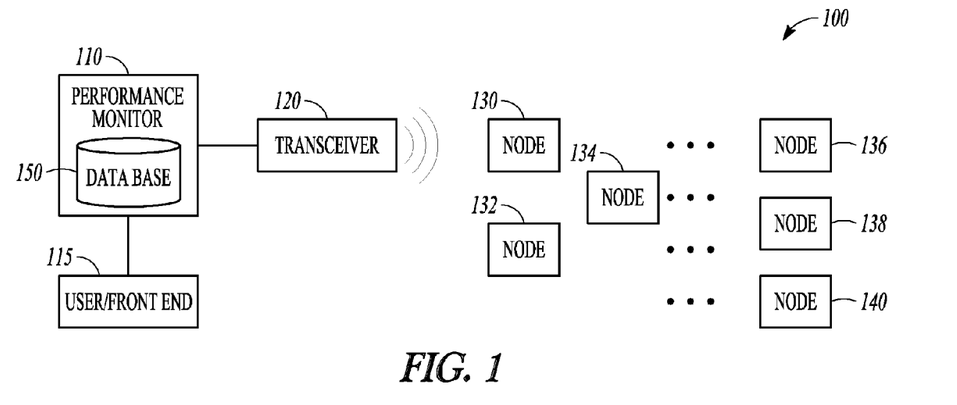
FIG. 1 is a block diagram of a wireless mesh network with performance monitoring according to an example embodiment.

FIG. 1 is a block diagram of a wireless mesh network 100. A tool backend, referred to in one embodiment as a performance monitor 110 is used via a user front end 115 to communicate via a transceiver 120 with multiple wireless nodes 130, 132, 134, 136, 138, and 140. In one embodiment, the performance monitor 110 and user front end 115 may be implemented on a personal computer, with the front end 115 comprising a user display and various input devices such as keyboard, mouse, touch screen, etc. In further embodiments, the performance monitor 110 may include a web server, with the front end 115 being remote and comprising a network appliance with a browser to interact with the performance monitor 110 over another network such as the internet.

In various embodiments, the tool backend 110 initiates testing of the network 100 at desired times and stores or logs performance data in a database 150. In some embodiments, the performance monitor 110 initiates a test of the network 100 at predetermined intervals, such as every 60 seconds. The intervals may vary in different embodiments from less than 60 seconds to greater than 60 seconds, or 60 minutes or longer.

A user, via the front end 115 can set traffic parameters for traffic generation during testing, can initiate periodic or one time basis testing, and can control when to start and stop a test. The user in some embodiments can select the nodes to participate in tests. In one embodiment, the user can use default values for traffic parameters, or can select from many different options to manually set parameters including for example, start time, manual or automatic modes, end time or duration, automatic cycle interval, node data collection behavior, node data sending behavior, throttle factor (represents a fraction of total network capacity required for the application), request packet length, response packet length, packet interval, and traffic interval distribution. The performance monitor 110 can use these traffic parameters to configure the nodes appropriately for the test.

Figure 2:
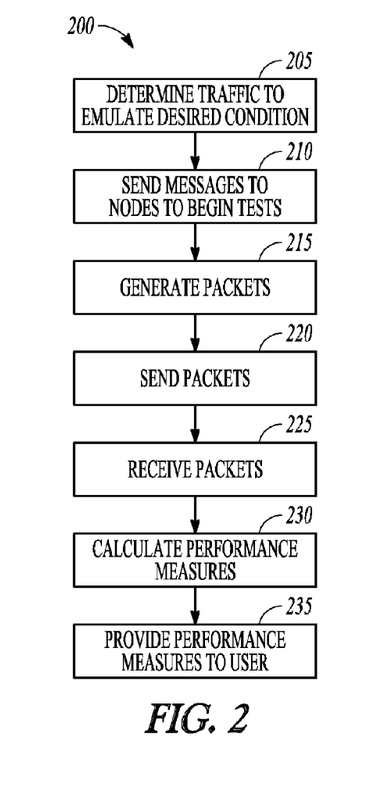
FIG. 2 is a flowchart of a method of generating test messages to stress network capacity and measure performance of the network according to an example embodiment.

In one embodiment, performance monitor 110 initiates a test of the network as represented at 200 in flowchart form in FIG. 2. At 205, the performance monitor determines the amount of traffic needed to emulate a desired condition, such as the overall network capacity. The amount of traffic may also be selected to emulate an application condition, such as an alarm condition when the network is used in a process control application. In further embodiments, the amount of traffic may be selected to test a desired scaling of the network.

The performance monitor 110 sends a message to the nodes to begin the test at 210. Each of the nodes begins generating test traffic at 215 for sending to a peer node or to the performance monitor 110 as indicated at 220. In one embodiment, the test traffic includes one or more packets generated at each node having characteristics, such as number, and size that would correspond to a desired test mode.

In one embodiment, the test mode may be intended to test the performance of the network during an alarm condition in an industrial process controller that is controlling an industrial plant. The term "alarm" condition is used to describe a condition where the application is in an abnormal state requiring an increased amount of information flow such that the network is handling the heaviest amount of traffic expected. Alarm conditions may occur in many different types of applications, in addition to an industrial control plant. The nodes may include sensors and actuators, and other types of nodes. The number and characteristics of the packets that are generated may vary depending on the load on the network 100 at the time the test is initiated. The total number of packets on the network should be the number that would be expected during the alarm condition, which may result in fewer or more test packets being generated depending on the current load on the network 100.

The performance monitor 110 can configure a node by specifying in the message to each node, or prior to initiation of the test, the number of packets to generate with given characteristics and frequency of generation and sending for the given test, or each node may default to a pre-programmed level of packet generation in different embodiments. An example configuration command may specify—one message every x seconds with y MB. The data in the packets may be any data that adequately emulates the desired size of packets that each node would generated in the alarm condition, and may consist of predetermined strings of numbers or characters.

In further embodiments, the test may include a desired number of packets to test scaling of the network. Scaling refers to adding nodes in one embodiment. While simply generating additional packets may not result in a precise simulation of scaling, the measurements derived can provide some insights into the effects of scaling the network.

Once the packets are generated and sent, the performance monitor 110 receives the test traffic at 225. The time of receipt of the packets and number of packets received are then analyzed to determine several performance measures, including latency, throughput, and packet loss at 230. This data may be provided to the user via front end 115 at 235. Alternatively, one or more peer nodes in the network may receive the test packets after which they send the test results to the performance monitor 110 for analysis.

Since the performance monitor knows the number of messages it should receive, it is a simple matter of comparing the number of messages received to the number expected to determine the ratio of received to sent packets. This ratio is representative of packet loss and reliability of the network when stressed. Throughput is also easily calculated by simply counting the number of messages received in a given time frame.

Latency can be measured in different ways. In one embodiment, each node may timestamp the packet when it is sent. If clocks in the nodes and performance monitor are properly synchronized, it is a simple matter of determining the time between the packets being sent and received, resulting in a simple latency calculation. In one embodiment, synchronized node time stamps are used. Synchronized node time stamps means that the nodes each have a common sense of time and that a time stamp is included in a sent packet whose value is related to the time of sending and that the time of reception is compared to the time stamp to estimate the one-way latency. A time stamp is included in a sent packet whose value is related to the time of sending the packet. The time of reception of the packet is compared to the sending time stamp to estimate the one-way latency.

In further embodiments, the performance monitor 110 generates a message that is received by one or more nodes and is immediately responded to. These messages are in addition to the message packets that are sent both as part of the normal network operation and the generated test messages from the nodes. When the response is received, the round trip time may be determined and is representative of round trip latency of the network. Round trip latency may include a dwell time at a node and two travel times in different directions that have asymmetrical latencies. If the dwell time at the node is known, the average travel time may be computed.

In further embodiments, message traffic between nodes may be generated to test the network. In this embodiment, the performance monitor 110 may also configure the nodes with desired traffic emulation parameters, including recipient nodes as opposed to the performance monitor 110 being the recipient. The traffic emulation parameters will be highly dependent on the application environment in which the network is deployed. In other words, an alarm condition for different industrial plants controlling different industrial processes may have different numbers of sensors and actuators and different maximum expected network traffic. The traffic emulation parameters may thus be specific for each network and application. Once initiated, the nodes themselves track receipt data and provide it to the performance monitor for appropriate performance calculations.

In some embodiments, the nodes calculate the performance measurements and send them to the performance monitor 110 for aggregation and storing. The performance measures may be calculated in a distributed manner. For example, two nodes may measure their peer latency and report the result to the performance monitor. Such measures may also be generated at multiple other sets of nodes.

Figure 3:
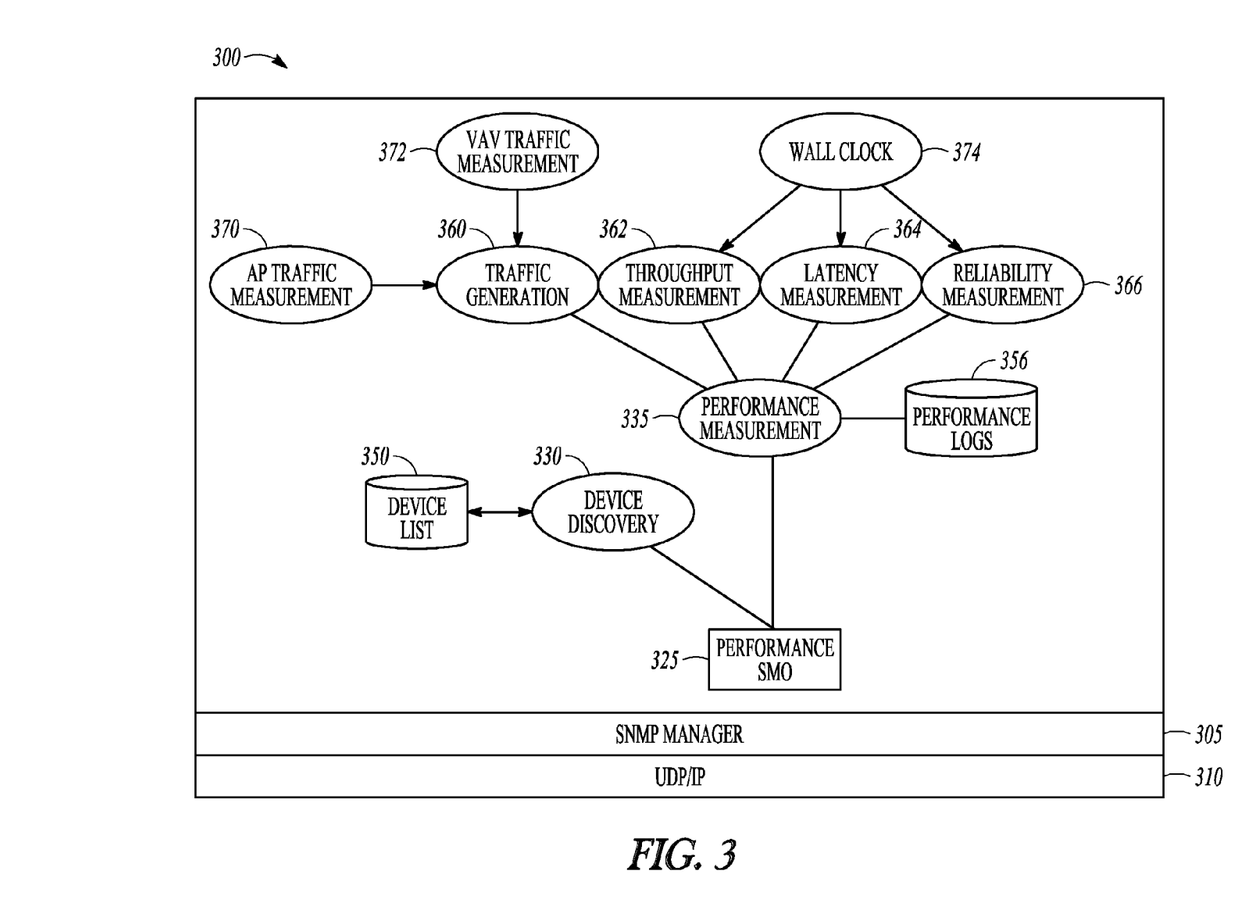
FIG. 3 is a block diagram illustrating objects for performing network performance tests according to an example embodiment.

FIG. 3 is a block diagram of an architecture 300 of a performance monitor according to an example embodiment. The architecture is built on an SNMP manager layer 305 and UDP/IP layer 310. Architecture 300 also includes a performance system management object 325. Object 325 performs several different methods, including device discovery 330, performance measurement 335.

Device discovery 330 keeps track of all the devices in the network, using a device list 350.

Performance measurement method 335 performs the performance monitoring functions described above, logging performance data into performance log data structure 356. Performance measurement method 335 invokes several other methods, including traffic generation 360, throughput measurement 362, latency measurement 364, and reliability measurement 366. Traffic generation method 360 may also utilize an AP (access point) traffic measurement method 370 and a VAV (variable air volume) traffic measurement method 372 to measure the existing application traffic in the network. A wall clock method 374 provides synchronized time information to the throughput measurement method 362, latency measurement method 364 and reliability measurement method 364. FIG. 3 illustrates one organization of an object for performance monitoring. Other object organizations may be used, as well as other non-object based programming implementations suitable for performing the functions described herein.

Figure 4:
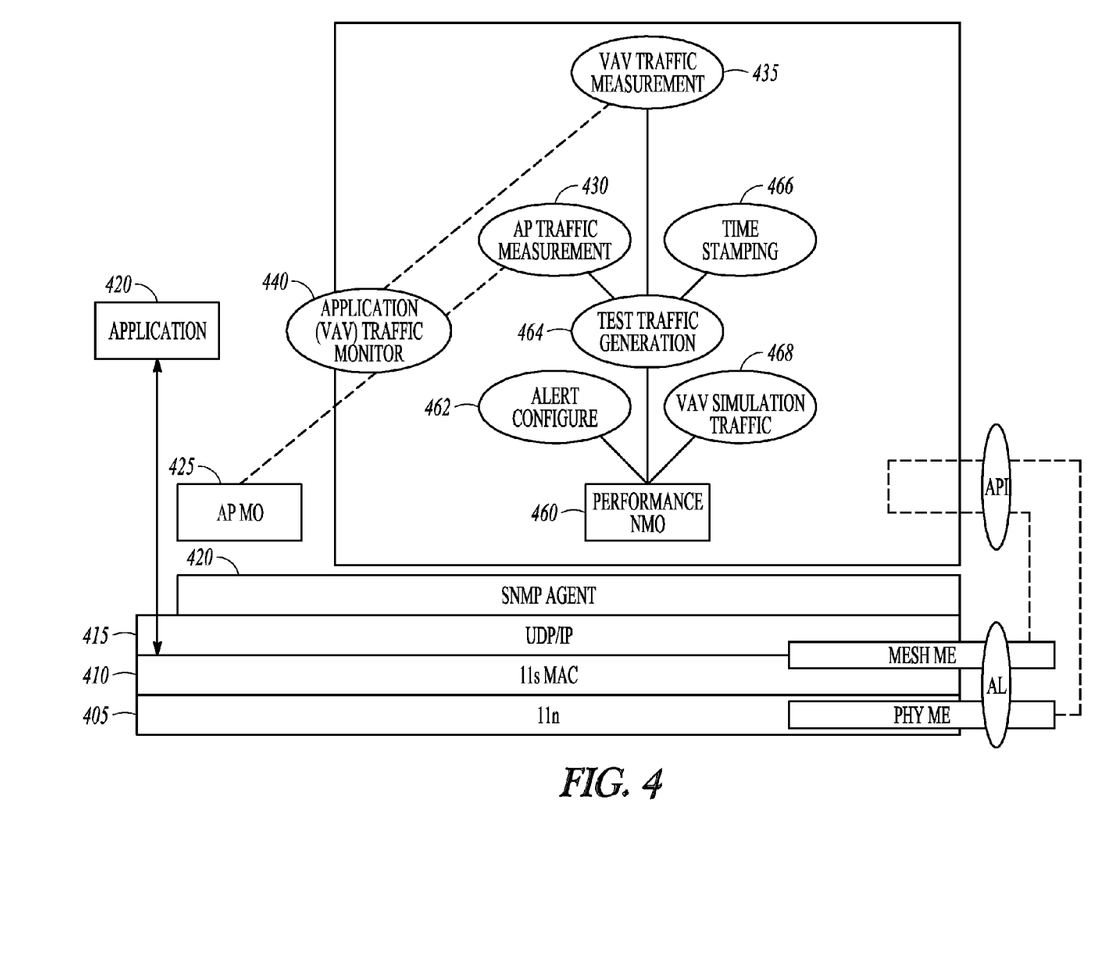
FIG. 4 is a block diagram illustrating objects for generating network traffic to test the network according to an example embodiment.

FIG. 4 is a block diagram of an architecture 400 of a wireless node according to an example embodiment. The architecture 400 starts with an abstraction layer that includes a physical layer 405 and a mesh ME that includes 11s MAC layer 410 and UDP/IP layer 415. An application 420 is coupled to the mesh layer for communicating application related information through the mesh network during normal operation of a node. Such normal application related information may include sensor information and actuator information for controlling one or more processes. Several objects are utilized to hold methods implemented by the node. An access point (AP) management object (MO) 425 is used to monitor AP traffic via an AP traffic measurement method 430 if the node supports an access point service. A VAV traffic measurement method 435 provides VAV traffic measurement to an application VAV traffic monitor method 440, which provides the measurement to the application 420.

A performance NMO 460 invokes several methods, including alert configure 462 and test traffic generation 464, which uses time stamping 466, as well as information from AP traffic measurement 430 and VAV traffic measurement 435. As with the system management object functions, the functions of the network management objects may be performed by software structured in many different ways. The illustrated object structure is just one example embodiment.

Figure 5:
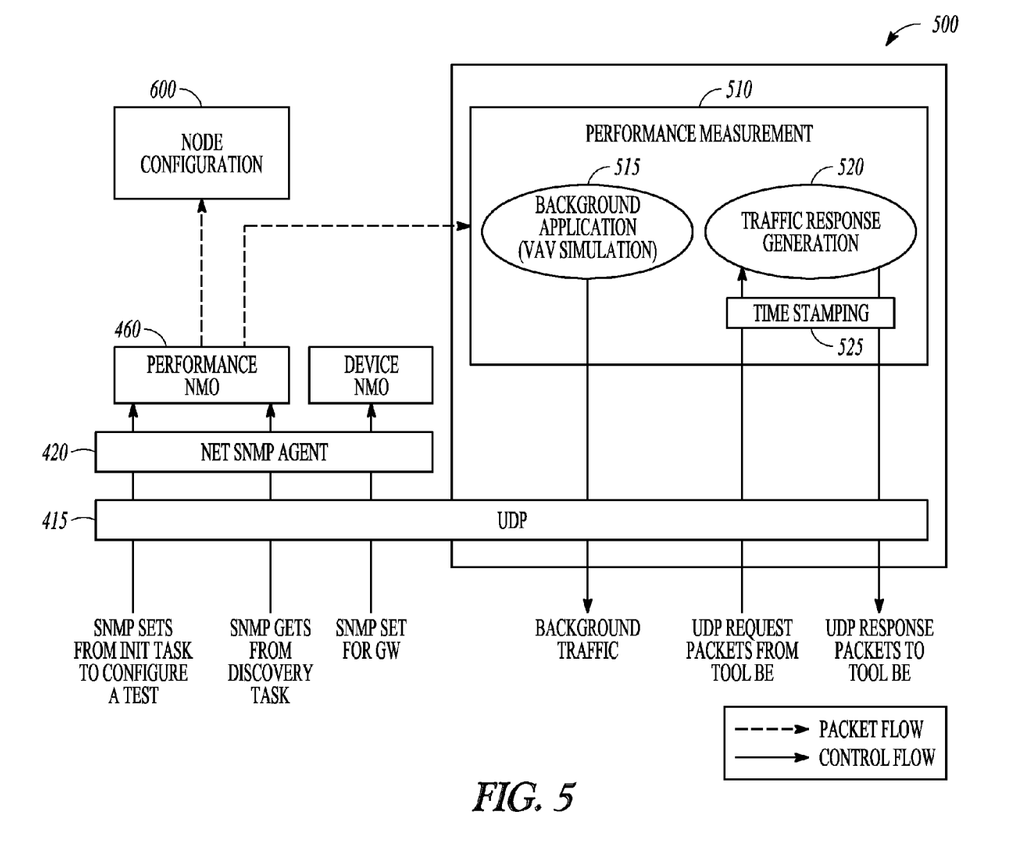
FIG. 5 is a block diagram of a wireless mesh node for performing traffic generation and time stamping according to an example embodiment.
Figure 6:
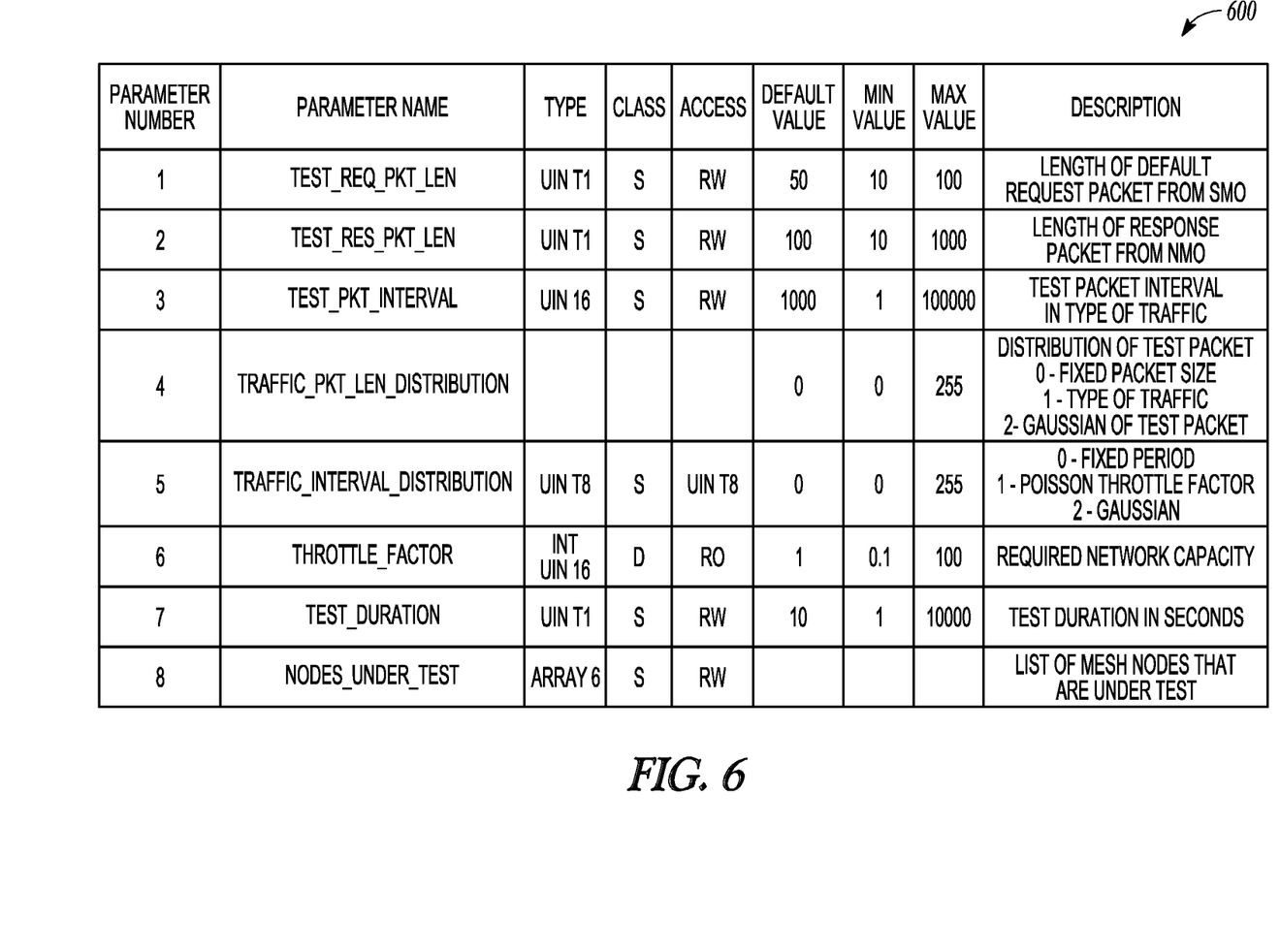
FIG. 6 is a table illustrating example mesh node configuration data according to an example embodiment.

Further detail of an example mesh node software design is illustrated in block form in FIG. 5 at 500, with detail of an example node configuration shown at 600 in FIG. 6 in table form. In one embodiment, performance NMO 460 provides node configuration details 600 as shown in further detail in FIG. 6. Performance NMO 460 also invokes a performance measurement function 510 that simulates background application (VAV simulation) traffic at 515 and responds to traffic via traffic response generation at 520 with suitable time stamping 525 which may be added to both received and sent packets.

Performance network management object 460 receives an SNMP set request to configure a task and retrieves information from the performance monitor in order to perform the test. Performance measurement function 510 then generates background traffic, receives UDP request packets from the performance monitor, and responds to such UDP request packets utilizing the time stamps. The solid lines in FIG. 5 represent packet flow, while the broken lines represent control flow.

Figure 7:
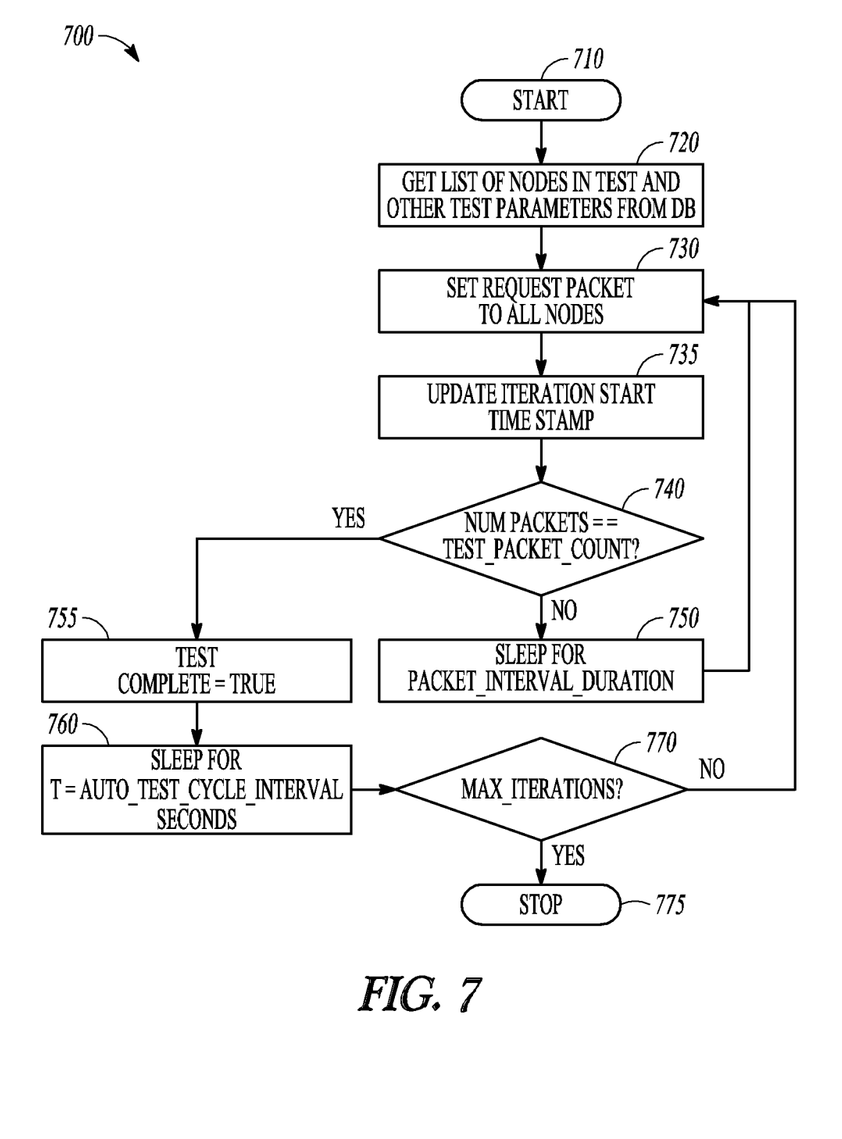
FIG. 7 is a flowchart illustrating a performance monitoring initiation task according to an example embodiment.

FIG. 7 is a flowchart representation of method 700. Method 700 runs in the performance monitor 110 in one embodiment. It may run in any control module or node coupled to the network 100 in further embodiments. The method starts at 710 and gets a list of nodes in test, along with other test parameters from database 150 at 720. The nodes and parameters may be user selected, or may be preprogrammed in as a default set of nodes and parameters in various embodiments. At 730, a test request packet is sent to at least the nodes involved in the test, and all nodes if desired. At 735, an iteration start time stamp is updated. A number of packets to be sent in the test is known, and at 740, the method determines whether all the expected packets have been sent. If not, the method sleeps at 750 for a desired packet interval duration and control returns to 730 to send another test request packet.

If all the packets have been sent as indicated at 740, the test iteration is complete as indicated at 755, and the method sleeps for a test cycle interval at 760. After the sleep is over, the method checks to see if a maximum number of iterations of the test have been performed. If yes, the method stops at 775. If no, processing continues again at 730 for the next iteration.

Figure 8:
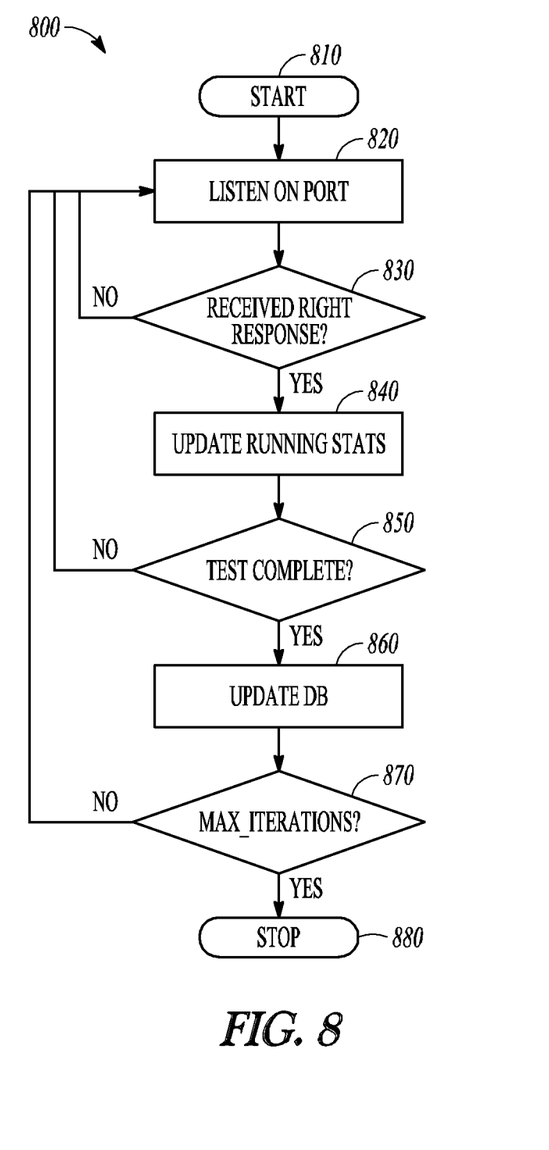
FIG. 8 is a flowchart illustrating a performance monitoring task according to an example embodiment.

A method 800 for performance monitoring is illustrated in flowchart form in FIG. 8. The method starts at 810, and at 820 the method listens for traffic on a port. If the right response is not received at 830, the method continues to listen at 820. If the right response was received, running performance monitoring statistics are updated at 840. At 850, a check is made on whether the test is complete. If not, listening continues at 820. If the test is complete at 850, the database is updated with the running statistics from 840. A check is then done to see if a maximum number of iterations of the test have been run. If yes, the method ends at 880. If not, the method returns to 820 to continue listening.

Figure 9:
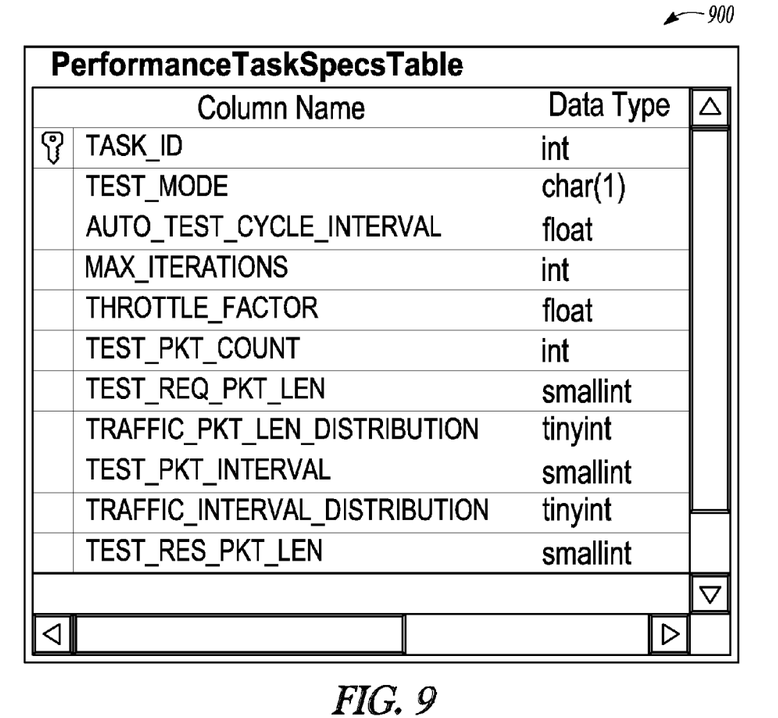
FIG. 9 is a table illustrating performance task specifications according to an example embodiment.
Figure 10:
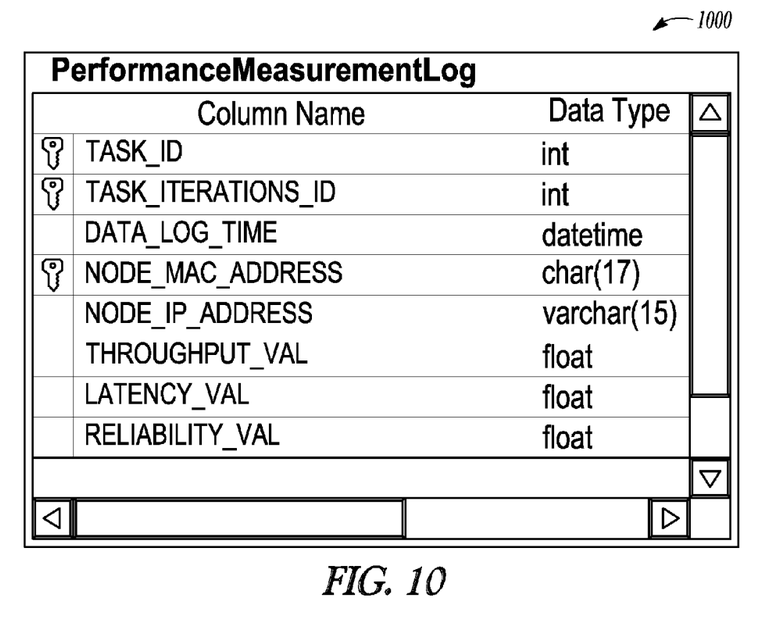
FIG. 10 is a table illustrating a performance measurement log according to an example embodiment.

FIG. 9 is a table 900 illustrating performance task specifications, identifying parameters and their data type that are used in monitoring performance. FIG. 10 is a table 1000 illustrating performance measurement log information that also includes the data type.

Figure 11:
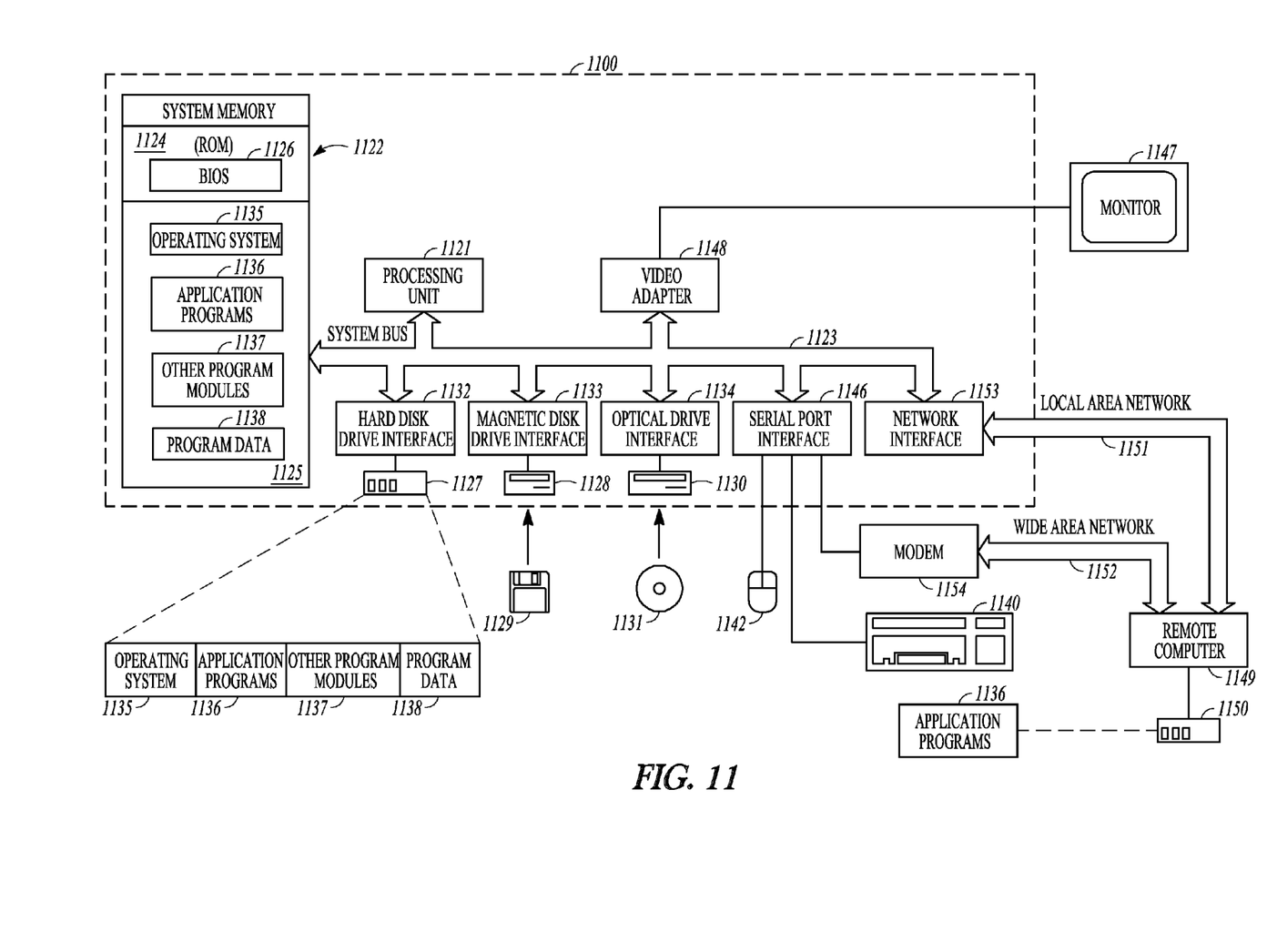
FIG. 11 is a block diagram of a computer system that can be used to implement nodes and a performance monitor according to an example embodiment.

FIG. 11 is a block diagram of a computer system to implement methods according to an example embodiment. In the embodiment shown in FIG. 11, a hardware and operating environment is provided that is applicable to any of the nodes and monitors described in the various embodiments.

As shown in FIG. 11, one embodiment of the hardware and operating environment includes a general purpose computing device in the form of a computer 1100 (e.g., a personal computer, workstation, or server), including one or more processing units 1121, a system memory 1122, and a system bus 1123 that operatively couples various system components including the system memory 1122 to the processing unit 1121. There may be only one or there may be more than one processing unit 1121, such that the processor of computer 1100 comprises a single central-processing unit (CPU), or a plurality of processing units, commonly referred to as a multi-processor or parallel-processor environment. In various embodiments, computer 1100 is a conventional computer, a distributed computer, or any other type of computer.

The system bus 1123 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1124 and random-access memory (RAM) 1125. A basic input/output system (BIOS) program 1126, containing the basic routines that help to transfer information between elements within the computer 1100, such as during start-up, may be stored in ROM 1124. The computer 1100 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media.

The hard disk drive 1127, magnetic disk drive 1128, and optical disk drive 1130 couple with a hard disk drive interface 1132, a magnetic disk drive interface 1133, and an optical disk drive interface 1134, respectively. The drives and their associated computer-readable media provide non volatile storage of computer-readable instructions, data structures, program modules and other data for the computer 1100. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1129, optical disk 1131, ROM 1124, or RAM 1125, including an operating system 1135, one or more application programs 1136, other program modules 1137, and program data 1138. Programming for implementing one or more processes or method described herein may be resident on any one or number of these computer-readable media.

A user may enter commands and information into computer 1100 through input devices such as a keyboard 1140 and pointing device 1142. Other input devices (not shown) can include a microphone, joystick, game pad, satellite dish, scanner, or the like. These other input devices are often connected to the processing unit 1121 through a serial port interface 1146 that is coupled to the system bus 1123, but can be connected by other interfaces, such as a parallel port, game port, or a universal serial bus (USB). A monitor 1147 or other type of display device can also be connected to the system bus 1123 via an interface, such as a video adapter 1148. The monitor 1147 can display a graphical user interface for the user. In addition to the monitor 1147, computers typically include other peripheral output devices (not shown), such as speakers and printers.

The computer 1100 may operate in a networked environment using logical connections to one or more remote computers or servers, such as remote computer 1149. These logical connections are achieved by a communication device coupled to or a part of the computer 1100; the invention is not limited to a particular type of communications device. The remote computer 1149 can be another computer, a server, a router, a network PC, a client, a peer device or other common network node, and typically includes many or all of the elements described above 110 relative to the computer 1100, although only a memory storage device 1150 has been illustrated. The logical connections depicted in FIG. 11 include a local area network (LAN) 1151 and/or a wide area network (WAN) 1152. Such networking environments are commonplace in office networks, enterprise-wide computer networks, intranets and the internet, which are all types of networks.

When used in a LAN-networking environment, the computer 1100 is connected to the LAN 1151 through a network interface or adapter 1153, which is one type of communications device. In some embodiments, when used in a WAN-networking environment, the computer 1100 typically includes a modem 1154 (another type of communications device) or any other type of communications device, e.g., a wireless transceiver, for establishing communications over the wide-area network 1152, such as the internet. The modem 1154, which may be internal or external, is connected to the system bus 1123 via the serial port interface 1146. In a networked environment, program modules depicted relative to the computer 1100 can be stored in the remote memory storage device 1150 of remote computer, or server 1149. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
determining an amount of network traffic to add to pre-existing traffic in an application specific network to emulate a desired application condition;
beginning a test of the application specific network such that application specific network nodes generate test traffic in accordance with the determined amount of network traffic to emulate the desired application condition;

receiving the test traffic; and calculating network performance measures as a function of the received test traffic.

2. The method of example 1 wherein the network comprises a wireless mesh network.

3. The method of example 1 wherein the performance measures are received by a performance monitor coupled to the network.

4. The method of example 1 wherein the performance measures include at least one of throughput, latency, and reliability measures.

5. The method of example 4 wherein the measures are performed periodically and results are received by the performance monitor.

6. The method of example 5 and further comprising generating an alert indicating the need for network maintenance based on a pre-specified limit for at least one of the performance measures.

7. The method of example 6 and further comprising providing a user interface to configure the desired application condition and the pre-specified limit and to view performance measures.

8. The method of example 1 wherein the traffic is generated during the test by preselected nodes to emulate an alarm condition of an application.

9. The method of example 8 wherein the application is process control having one or more of controllers, sensors and actuators coupled via the network nodes.

10. The method of example 1 wherein the traffic is generated during the test by preselected nodes to emulate the effect of increasing the number of nodes in the network wherein each added node carries an equivalent added portion of the pre-existing traffic.

11. The method of example 1 and further comprising:
sending a packet to a node;
receiving a response from the node; and
calculating a round trip latency based on the difference in time between sending the packet and receiving the response and considering the turnaround delay in the node.

12. The method of example 1 wherein a one-direction latency performance measure is calculated as a function of synchronized node time stamps in received test traffic.

13. The method of example 1 wherein beginning a test comprises sending a request to at least one node in the network from a performance monitor coupled to the network and receiving the network performance measures at the performance monitor.

14. A computer readable storage device having instructions for causing a computer to perform a method, the method comprising:
determining an amount of network traffic to add to pre-existing traffic in an application specific network to emulate a desired application condition;
beginning a test of the application specific network such that application specific network nodes generate test traffic in accordance with the determined amount of network traffic to emulate the desired application condition;
receiving the test traffic; and
calculating network performance measures as a function of the received test traffic.

15. The method of example 14 wherein the network comprises a mesh network, wherein the performance measures are received by a performance monitor coupled to the network, and wherein the performance measures include at least one of throughput, latency, and reliability measures.

16. The method of example 14 wherein the traffic is generated during the test by preselected nodes to emulate an alarm condition of an application.

17. The method of example 14 wherein the traffic is generated during the test by preselected nodes to emulate the effect of increasing the number of nodes in the network wherein each added node carries an equivalent added portion of the pre-existing traffic.

18. The method of example 14 further comprising:
sending a packet to a node;
receiving a response from the node; and
calculating a round-trip latency based on the difference in time between sending the packet and receiving the response considering the delay in the node.

19. A network performance monitor comprising:
a module to determine an amount of network traffic to add to pre-existing traffic in an application specific network to emulate a desired application condition;
a module to begin a test of the application specific network such that application specific network nodes generate test traffic in accordance with the determined amount of network traffic to emulate the desired application condition; and
a module to receive the test traffic and calculate network performance measures as a function of the received test traffic.

20. The network performance monitor of example 19 wherein the performance measures include at least one of throughput, latency, and reliability measures.

21. The network performance monitor of example 19 wherein the module to determine an amount of network traffic to add to traffic in the network specifies a number, size and time distribution of packets of network traffic to be generated during the test by preselected nodes to emulate an alarm condition of an application.

22. The performance monitor of example 20 wherein the application is process control having one or more of controllers, sensors and actuators coupled via the network nodes.

23. The performance monitor of example 19 and further comprising:
a module to send a packet to a node;
a module to receive a response from the node; and
a module to calculate a latency based on the difference in time between sending the packet and receiving the response.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
determining an amount of network traffic to add to pre-existing traffic in an application specific network to emulate a desired application condition;
beginning a test of the application specific network such that application specific network nodes generate test traffic in accordance with the determined amount of network traffic to emulate the desired application condition;
receiving the test traffic; and
calculating network performance measures as a function of the received test traffic;
wherein the test traffic is generated during the test by preselected nodes to emulate the effect of increasing the number of nodes in the network wherein each added node carries an equivalent added portion of the pre-existing traffic.

2. The method of claim 1 wherein the network comprises a wireless mesh network.

3. The method of claim 1 wherein the performance measures are received by a performance monitor coupled to the network.

4. The method of claim 1 wherein the performance measures include at least one of throughput, latency, and reliability measures.

5. The method of claim 4 wherein the measures are performed periodically and results are received by the performance monitor.

6. The method of claim 5 and further comprising generating an alert indicating the need for network maintenance based on a pre-specified limit for at least one of the performance measures.

7. The method of claim 6 and further comprising providing a user interface to configure the desired application condition and the pre-specified limit and to view performance measures.

8. The method of claim 1 wherein the traffic is generated during the test by preselected nodes to emulate an alarm condition of an application.

9. The method of claim 8 wherein the application is process control having one or more of controllers, sensors and actuators coupled via the network nodes.

10. The method of claim 1 and further comprising:
sending a packet to a node;
receiving a response from the node; and
calculating a round trip latency based on the difference in time between sending the packet and receiving the response and considering the turnaround delay in the node.

11. The method of claim 1 wherein a one-direction latency performance measure is calculated as a function of synchronized node time stamps in received test traffic.

12. The method of claim 1 wherein beginning a test comprises sending a request to at least one node in the network from a performance monitor coupled to the network and receiving the network performance measures at the performance monitor.

13. A computer readable storage device having instructions for causing a computer to perform a method, the method comprising:
determining an amount of network traffic to add to pre-existing traffic in an application specific network to emulate a desired application condition;
beginning a test of the application specific network such that application specific network nodes generate test traffic in accordance with the determined amount of network traffic to emulate the desired application condition;
receiving the test traffic; and
calculating network performance measures as a function of the received test traffic;
wherein the test traffic is generated during the test by preselected nodes to emulate the effect of increasing the number of nodes in the network wherein each added node carries an equivalent added portion of the pre-existing traffic.

14. The method of claim 13 wherein the network comprises a mesh network, wherein the performance measures are received by a performance monitor coupled to the network, and wherein the performance measures include at least one of throughput, latency, and reliability measures.

15. The method of claim 13 wherein the traffic is generated during the test by preselected nodes to emulate an alarm condition of an application.

16. A network performance monitor comprising:
a module to determine an amount of network traffic to add to pre-existing traffic in an application specific network to emulate a desired application condition;
a module to begin a test of the application specific network such that application specific network nodes generate test traffic in accordance with the determined amount of network traffic to emulate the desired application condition; and
a module to receive the test traffic and calculate network performance measures as a function of the received test traffic;
wherein the test traffic is generated during the test by preselected nodes to emulate the effect of increasing the number of nodes in the network wherein each added node carries an equivalent added portion of the pre-existing traffic.

17. The network performance monitor of claim 16 wherein the performance measures include at least one of throughput, latency, and reliability measures.

18. The network performance monitor of claim 16 wherein the module to determine an amount of network traffic to add to traffic in the network specifies a number, size and time distribution of packets of network traffic to be generated during the test by preselected nodes to emulate an alarm condition of an application.

19. The performance monitor of claim 16 and further comprising:
a module to send a packet to a node;
a module to receive a response from the node; and
a module to calculate a latency based on the difference in time between sending the packet and receiving the response.

* * * * *